UNITED STATES PATENT OFFICE.

MOMME ANDRESEN, OF BERLIN, GERMANY, ASSIGNOR TO THE ACTIEN-GESELLSCHAFT FÜR ANILIN FABRIKATION, OF SAME PLACE.

MANUFACTURE OF A NEW ALPHA-NAPHTHOL-DISULPHONIC ACID.

SPECIFICATION forming part of Letters Patent No. 405,938, dated June 25, 1889.

Application filed April 27, 1888. Serial No. 272,047. (Specimens.) Patented in Germany March 16, 1888, No. 45,776; in England March 26, 1888, No. 4,625, and in France March 31, 1888, No. 189,712.

*To all whom it may concern:*

Be it known that I, MOMME ANDRESEN, of Berlin, in the Kingdom of Prussia, German Empire, have invented new and useful Improvements in the Manufacture of a New Alpha-Naphthol-Disulphonic Acid, (for which I have filed an application in England, No. 4,625, dated March 26, 1888, and obtained patents in Germany, No. 45,776, March 16, 1888, and France, No. 189,712, March 31, 1888;) and I do hereby declare that the following is a full, clear, and exact description of the invention, which will enable others skilled in the art to which it appertains to make and use the same.

If naphthalene-disulphonic acid as obtained by treating naphthalene with sulphuric acid and monochlorhydrin or with fuming sulphuric acid at a temperature of from 30° to 60° Celsius is subject to a treatment with nitric acid, two nitro-naphthalene-disulphonic acids of an isomeric constitution are formed. By reducing these nitro compounds two isomeric amido-naphthalene-disulphonic acids are obtained which can be separated by forming their sodium salts and crystallizing the same from a concentrated solution in water. The amido-naphthalene-disulphonic acid, the sodium salt of which is less soluble in water, corresponds to the alpha-naphthol-disulphonic acid of German Letters Patent No. 40,571. If this amido-naphthalene-disulphonic acid is separated by filtration, the filtered solution contains a new amido-naphthalene-disulphonic acid which precipitates in small crystals when hydrochloric acid is added. For the production of this new amido-naphthalene-disulphonic acid and the corresponding naphthol-disulphonic acid the following method can be recommended.

To twenty kilos of naphthalene one hundred kilos of fuming sulphuric acid which contain twenty-three per cent. of sulphurous anhydride are gradually added. The naphthalene is stirred continually and the temperature carefully kept below 60° Celsius. The melt forms at one time of the operation a clear liquid, from which the formed naphthalene-disulphonic acid crystallizes as soon as the operation is completed. For the now following treatment with nitric acid the melt is carefully cooled with ice-water, after which fourteen kilos of nitric acid of 45° Baumé are gradually poured to it. During this reaction the temperature is kept below 40° Celsius and the mixture stirred without interruption. After the reaction is completed the melt is dissolved in one thousand liters of cold water, and milk of lime is added to it until the liquid is neutralized. The mixture is then heated up to its boiling-point, the sulphate of lime which has been formed is separated by filtration, and the resulting solution containing the lime salts of the nitro-naphthalene-disulphonic acids is concentrated.

The nitro-naphthalene-disulphonic acids are converted into the corresponding amido-naphthalene-disulphonic acids by reduction with iron and sulphuric acid. As soon as this reaction is completed, milk of lime is added to the boiling mixture. By filtration a solution results which contains the lime salts of the amido-naphthalene-disulphonic acids. By treating with sodium carbonate the lime salts are converted into sodium salts. The filtered solution of the sodium salts is concentrated up to crystallization. After cooling, the neutral sodium salt of that amido-naphthalene-disulphonic acid which corresponds to the naphthol-disulphonic acid of German Letters Patent No. 40,571 becomes precipitated and is separated by filtration. To the filtered solution hydrochloric acid is added in excess, which causes the acid sodium salt of the new amido-naphthalene-disulphonic acid to be precipitated. This is filtered and dried. In order to obtain the new substance in the form of crystals, it is dissolved in five parts of boiling water, when, after cooling, it will be obtained in long white needles. Investigation has shown that the new acid is expressed by the formula

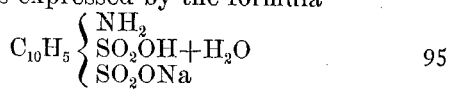

If the substance is subject to destructive distillation in the presence of lime, alpha-naphthylamine is produced.

In order to produce the corresponding alpha-naphthol-disulphonic acid, the new alpha-naphthylamine-disulphonic acid is next converted into its diazo compound.

The diazo compound precipitates in colorless needles, which are filtered, pressed, and suspended again in water, whereupon they are gradually poured into boiling water which has been acidulated with a small quantity of sulphuric acid.

When conversion has been completed, the liquid is neutralized by milk of lime, filtered, and the lime salt of the new alpha-naphthol-disulphonic acid transformed into the sodium salt by a solution of carbonate of sodium. The filtered solution of the sodium salt is then concentrated, and after cooling it is obtained in long colorless needles, differing in this point considerably from the alpha-naphthol-disulphonic acid of German Letters Patent No. 40,571, which under similar circumstances crystallizes in small white leaflets.

To indicate yet another difference between the new alpha-naphthol-disulphonic acid and the naphthol-disulphonic acid of German Letters Patent No. 40,571, it may be stated that no yellow dye-stuff soluble with difficulty is obtained when the new sulphonic acid is treated with nitric acid.

By treating the naphthol-disulphonic acid of German Letters Patent No. 40,571 with nitric acid it is converted into the so-called "brilliant yellow." Finally, it may be stated that the new naphthol-disulphonic acid also acts upon the diazo compounds of diphenyl, ditolyl, stilbene, &c. Blue dye-stuffs are obtained by these reactions which dye cotton in a soap bath without any mordants.

What I claim is—

The new alpha-naphthol-disulphonic acid obtained by first forming naphthalene-disulphonic acid by treating naphthalene with sulphuric acid and monochlorhydrin, or with fuming sulphuric acid, then treating the naphthalene-disulphonic acid so formed with nitric acid, reducing the resulting alpha-nitro-naphthalene-disulphonic acid to alpha-amido-naphthalene-disulphonic acid, separating and converting into the corresponding alpha-naphthol-disulphonic acid, substantially as described.

MOMME ANDRESEN.

Witnesses:
B. ROI,
F. VON VERSEN.